Figure 1:
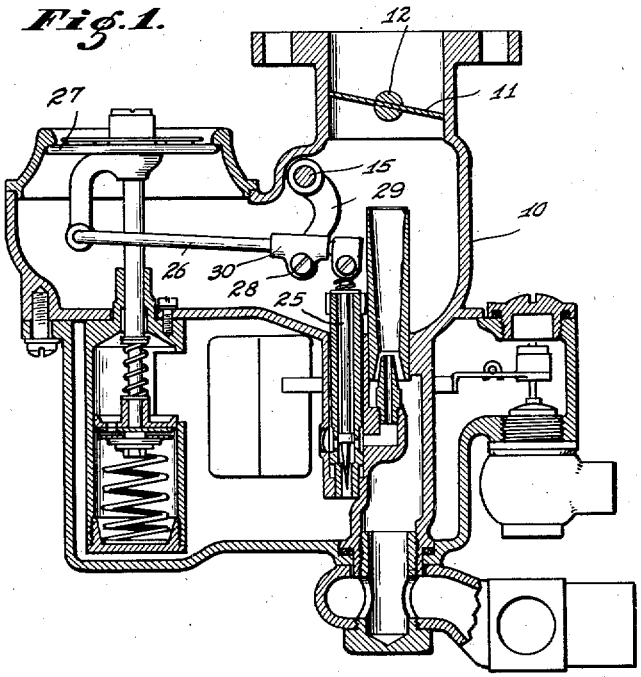

A. L. KIMBALL

CARBURETOR

Feb. 17, 1931. Re. 17,965

Original Filed Sept. 24, 1924

INVENTOR.
ANDREW L. KIMBALL

BY
Geo. B. Ashley.
ATTORNEY.

Reissued Feb. 17, 1931

Re. 17,965

UNITED STATES PATENT OFFICE

ANDREW L. KIMBALL, OF DETROIT, MICHIGAN, ASSIGNOR TO THE WHEELER-SCHEBLER CARBURETOR CO., OF INDIANAPOLIS, INDIANA, A CORPORATION OF INDIANA

CARBURETOR

Original No. 1,761,569, dated June 3, 1930, Serial No. 739,479, filed September 24, 1924. Application for reissue filed November 5, 1930. Serial No. 493,593.

It is the primary object of my invention to make an automotive engine less liable to stall when cold. A second object is to make it less likely that an operator will leave the mixture-enriching device of a carburetor set in the mixture-enriching position after the engine has reached its normal running temperature. A third object is to make the engine easier to start when cold.

It is customary to adjust the carburetor of an automotive engine so that when the latter is running idle it will run quite slowly and yet smoothly. It is possible to accomplish this after the engine is thoroughly warmed up; but with this carburetor setting the engine will not run when cold, especially at the low speeds. It is therefore customary to provide mixture-enriching devices to facilitate both the starting of the engine and the running thereof during the warming-up period. Even with such a mixture-enriching device, considerably more throttle is necessary to insure continued running while the engine is cold than when it is hot. In other words, the engine is liable to stall when cold at the low speeds that are found entirely satisfactory when the engine is hot. Moreover, when a mixture-enriching device is set to its mixture-enriching position for starting a cold engine, the operator very frequently forgets to return it to its normal position when the engine is warmed up.

Many types of carburetors make it easiest to start the engine when the throttle is at or near some certain position, especially when the engine is cold. In certain cases, it is particularly hard to start with the throttle too wide open; while starting with it too nearly closed will frequently result in stalling. Inexpert operators often experience trouble in starting due to their inability to set the throttle in the best position, in addition to being annoyed by frequent stalling due to too low an engine speed when idling cold.

By my invention, I provide in connection with the mixture-adjusting device a device which, when the mixture-adjusting device is set for starting cold, automatically sets the throttle in a position for easy starting, and at the same time in a position which insures a sufficient engine speed to prevent stalling even when the engine is cold; and which upon the return of the mixture-adjusting device to its normal position allows the throttle likewise to return to its normal idling position. If the operator neglects to return the mixture-adjusting device to its normal position after the engine is warmed up, he is soon reminded of that fact by his inability to slow down his engine to its usual low idling speed.

Figure 2:
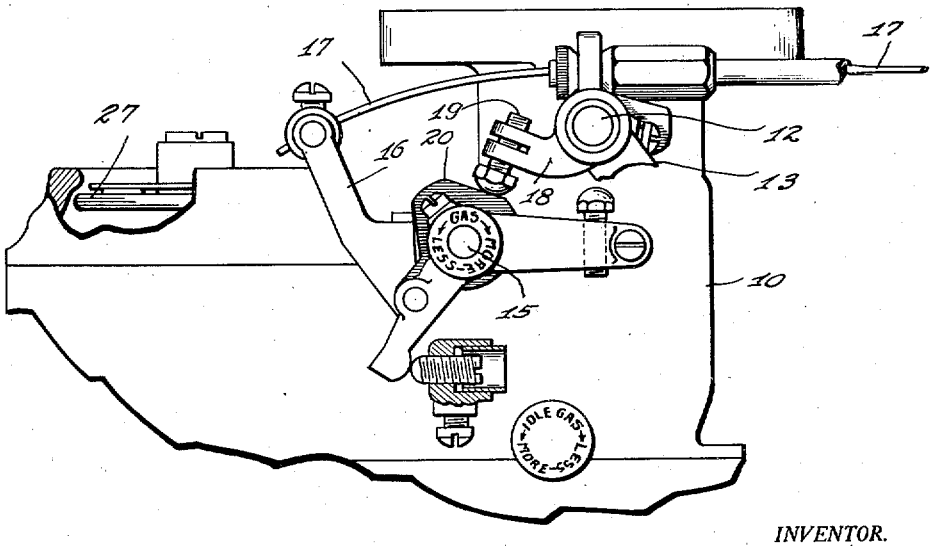

The accompanying drawing illustrates an apparatus embodying my invention as applied to one particular carburetor: Figure 1 is a vertical section through a carburetor of the preferred type, to which I have shown my invention applied; and Figure 2 is an enlarged fragmentary elevation, showing the interconnection between the throttle and the mixture-controlling member.

The careburetor has a main body 10, the outlet from which to the engine is controlled by a throttle 11 on a throttle-shaft 12. The throttle shaft 12 may be operated in any usual way, and only a part of the operating arm 13 of the throttle-shaft 12 is illustrated in Figure 2, because such normal operating mechanism for the throttle-shaft constitutes no part of my present invention.

Within the main body 10 of the carburetor, the explosive mixture is produced by mixing the fuel and air, in any usual or convenient manner. The proportion of fuel and air in the mixture may be varied, as to enrich the mixture for starting, by manipulation of a shaft 15, which may be turned in any suitable way. As shown, the shaft 15 is provided with an operating arm 16, which may be operated by a Bowden wire 17, leading to any convenient control-point, such as the dash of an automobile. For my broad invention, it is immaterial how the shaft 15 controls the proportion of fuel and air in the mixture; but as it is involved in certain more specific combinations which I claim, one mechanism by which such shaft controls the mixture proportions will be described later.

My invention contemplates an interconnection between the shaft 15 and the shaft 12, so that when the shaft 15 is turned clockwise (Figures 1 and 2) to produce a richer mixture, as for starting or idling cold, the throttle-shaft 12 will also be moved, to produce an opening of the throttle 11 to some extent. For this purpose, the shaft 12 is shown as having fixed thereto an arm 18, shown as having an adjustable abutment-screw 19 in its end, and this abutment-screw 19 bears against a cam 20 fixed on the shaft 15. When the shaft 15 is rocked in a clockwise direction, to enrich the mixture, the cam 20 acts on the screw 19 and arm 18 to rock the throttle-shaft 12 in a clockwise direction from the closed position in which such throttle-shaft 12 is shown. Such interconnection between the shafts 12 and 15 does not interfere with the wider opening of the throttle 11 than that produced by the interaction of the cam 20 and screw 19; and if the throttle is open more than the opening such cam would cause, no movement of the throttle 11 is obtained by the movement of the shaft 15. The interaction of the cam 20 and screw 19, however, makes it impossible for the throttle 11 to be completely closed when the shaft 15 has been rocked in a clockwise direction; so that this interconnection insures that the throttle 11 will be open at least to a definitely determined position when the mixture is adjusted for starting and idling with the engine cold. This not only facilitates starting, by producing a sufficient opening of the throttle, but also prevents the operator from throttling down to those low speeds at which the engine when cold would be liable to stall.

Of course, when the engine has warmed up, the Bowden wire 17 should be operated to return the shaft 15 to its normal position; after which the throttle 11 may be closed farther, to any limits provided for normal running. If this is not closed, the operator is soon reminded of that fact by his inability to throttle down to low speeds.

While my invention is applicable to any type of mixture-adjusting means, operated by the movement of parts such as the shaft 15, I have shown it in connection with a specific type of mixture-adjustment; as with that type of mixture-adjustment I have obtained very beneficial results. This particular mixture-adjustment when used with my invention involves certain sub-combinations, which will be particularly pointed out in some of the more specific claims; but it is not essential to the broad combination.

In this particular mixture-adjustment, there is a fuel-control needle 25, suitably hung from the right-hand end of a connecting lever 26, to the left-hand end of which connecting lever is connected a secondary-air valve 27. The lever 26 is fulcrumed intermediately on a pivot pin 28, carried by the outer end of an arm 29 fixed on the shaft 15. The mounting of the lever 26, however, is not directly on the pivot-pin 28, for the lever 26 has slidably mounted thereon a sleeve 30, to which the pivotal connection of the arm 29 by the pivot pin 28 is made. By the turning of the shaft 15 in a clockwise direction, as to enrich the mixture for starting and idling of a cold engine, the pivot pin 28 is swung to the left and upward. The upward component of movement produces a lifting of the needle valve 25, without any corresponding movement of the secondary-air valve 27; and thus produces an enriching of the mixture directly. The leftward component of movement of the pivot-pin 28 varies the relative lever-arm lengths of the parts of the lever 26, and thus increases the rate of opening of the needle valve 25 for a given rate of opening of the secondary-air valve 27. Thus when the shaft 15 is set at its counter-clockwise limit of movement, for normal operation after the engine has been warmed up, the lift of the needle 25 for a given opening of the secondary-air valve 27 is at a minimum, resulting in high economy and efficiency of operation; whereas when the shaft 25 is moved in a clockwise direction from the position shown, whether to the limit of movement of such clockwise direction or not, the needle 25 is lifted positively by such movement, to produce a richer mixture, and also is arranged to have a proportionately greater opening movement for any given opening movement of the secondary-air valve 27.

I claim as my invention:

1. In a carburetor, the combination of a mixing chamber having a fuel nozzle and an air-admission opening, a fuel-adjusting needle, an air controlling valve, a lever connecting said needle and valve, means for shifting the fulcrum of said lever, a throttle, and means operated by said fulcrum-shifting means for variably limiting the closing of said throttle.

2. In a carburetor, the combination of a mixing chamber having a fuel nozzle and an air-admission opening, a fuel-adjusting needle, an air-controlling valve, a lever connecting said needle and valve, means for varying the relative lengths of the arms of said lever, a throttle, and means operated by the varying of said relative lever-arm lengths for variably limiting the closing of said throttle.

3. In a carburetor, the combination of a mixing chamber having a fuel nozzle and an air-admission opening, a fuel-adjusting needle, an air-controlling valve, a lever connecting said needle and valve, means for varying the fuel opening produced at said needle for a given opening at said air-controlling valve, and means operated by said needle-controlling means for variably limiting the closing of said throttle.

4. In a carburetor the combination of a manually controllable fuel mixture enrichening device, a throttle movable separately therefrom and controlling the flow of air through the carburetor, a cam associated with said device, and a lever connected with the throttle and adapted to engage said cam, said cam being so formed as to limit the closing of the throttle as the mixture enrichening device approaches its reclining position for starting purposes.

5. In a carburetor including a casing, a throttle associated therewith operable from a remote point, a shaft carried by said casing for transmitting movement to said throttle, a mixture enrichening device and a second shaft carried by said casing for operating said device, mechanism mounted in close proximity to said casing in association with both of said shafts adapted to actuate said throttle shaft to slightly open said throttle whenever said second shaft is actuated in a direction for engine starting purposes, said mechanism being mounted on said second shaft for acting on said throttle shaft and to remain unaffected by remote control of said throttle.

In testimony whereof I have hereunto subscribed my name at Detroit, Wayne County, Michigan.

ANDREW L. KIMBALL.